(12) United States Patent
Lim et al.

(10) Patent No.: US 9,395,815 B2
(45) Date of Patent: Jul. 19, 2016

(54) TERMINAL SYSTEM AND FLEXIBLE TERMINAL

(71) Applicant: SAMSUNG DISPLAY CO., LTD., Yongin-si, Gyeonggi-do (KR)

(72) Inventors: Ji-Soo Lim, Yongin-si (KR); Yong-Joon Lee, Yongin-si (KR); Hae-Kang Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 539 days.

(21) Appl. No.: 13/648,743

(22) Filed: Oct. 10, 2012

(65) Prior Publication Data

US 2013/0336304 A1 Dec. 19, 2013

(30) Foreign Application Priority Data

Jun. 19, 2012 (KR) .......................... 10-2012-0065616

(51) Int. Cl.
| | |
|---|---|
| H04W 84/12 | (2009.01) |
| G06F 3/01 | (2006.01) |
| H04M 1/02 | (2006.01) |
| G06F 1/16 | (2006.01) |
| H04M 1/725 | (2006.01) |
| H04B 1/3827 | (2015.01) |

(52) U.S. Cl.
CPC ................ *G06F 3/014* (2013.01); *G06F 1/163* (2013.01); *H04M 1/0268* (2013.01); *H04B 2001/3861* (2013.01); *H04M 1/7253* (2013.01); *H04M 2250/02* (2013.01); *H04M 2250/12* (2013.01)

(58) Field of Classification Search
CPC ...... G06F 1/163; G06F 3/014; H04M 1/0268; H04M 1/7253; H04M 2250/02; H04M 2250/12; H04B 2001/3861

USPC .............. 455/575.3; 345/156, 169, 173–178; 178/18.01–18.09

See application file for complete search history.

(56) References Cited

U.S. PATENT DOCUMENTS

| | | | | |
|---|---|---|---|---|
| 7,456,823 | B2 * | 11/2008 | Poupyrev et al. | 345/173 |
| 8,085,248 | B2 * | 12/2011 | Breimesser et al. | 345/173 |
| 2006/0047208 | A1 | 3/2006 | Yoon | |
| 2009/0039353 | A1 * | 2/2009 | Jun et al. | 257/72 |
| 2009/0247218 | A1 * | 10/2009 | Lee et al. | 455/553.1 |
| 2010/0011291 | A1 | 1/2010 | Nurmi | |

(Continued)

FOREIGN PATENT DOCUMENTS

| | | |
|---|---|---|
| EP | 2 192 750 A2 | 6/2010 |
| EP | 2 365 530 A2 | 9/2011 |

(Continued)

OTHER PUBLICATIONS

Extended European Search Report, dated Sep. 27, 2013, for Application No. 13151759.1, 8 pages.

EPO Office action dated Jun. 3, 2016, for corresponding European Patent application 13151759.1, (6 pages).

*Primary Examiner* — Amare Mengistu
*Assistant Examiner* — Stacy Khoo
(74) *Attorney, Agent, or Firm* — Lewis Roca Rothgerber Christie LLP

(57) ABSTRACT

A including a first terminal and a second terminal that are configured to be coupled to each other over a local area wireless communication network, wherein the second terminal senses the amount of transformation of the second terminal and displays different information according to the amount of transformation of the second terminal.

24 Claims, 6 Drawing Sheets

(56) References Cited

U.S. PATENT DOCUMENTS

| | | | |
|---|---|---|---|
| 2010/0015919 A1* | 1/2010 | Tian .............................. | 455/41.2 |
| 2010/0285785 A1* | 11/2010 | Wang et al. ................... | 455/418 |
| 2013/0201115 A1* | 8/2013 | Heubel ......................... | 345/173 |
| 2013/0201215 A1* | 8/2013 | Martellaro et al. ........... | 345/633 |
| 2013/0217978 A1* | 8/2013 | Ma ............................... | 600/301 |

FOREIGN PATENT DOCUMENTS

| | | |
|---|---|---|
| KR | 10-2006-0019869 | 3/2006 |
| KR | 10-2010-0035672 A | 4/2010 |
| KR | 10-2011-0028650 | 3/2011 |
| WO | WO 2012/061438 A2 | 5/2012 |

\* cited by examiner

TERMINAL SYSTEM AND FLEXIBLE TERMINAL

CROSS-REFERENCE TO RELATED PATENT APPLICATION

This application claims priority to and the benefit of Korean Patent Application No. 10-2012-0065616, filed in the Korean Intellectual Property Office on Jun. 19, 2012, the entire content of which is incorporated herein by reference.

BACKGROUND

1. Field

The present invention relates to a terminal system and a flexible terminal.

2. Description of the Related Art

Terminals have a wide range of uses. Among them, mobile phones perform various functions as well as a conventional telephonic function, and recently, the uses thereof are expanding. In particular, a smartphone performs various functions such as reproducing and recording multimedia content, execution of applications, and the like by installing a system similar to a computer operating system therein.

In addition, if necessary or desired, such a smartphone may additionally include a function desired by a user that is enabled through installation of a separate component, such as a functional chip, other than installation of applications.

Often, a user carries a mobile phone, such as a smartphone, during an activity such as cycling or running. However, when running or jogging, it is difficult for the user to check information on the mobile phone. Thus, recent terminals, such as mobile phones, are limited in improving user convenience.

SUMMARY

Aspects of embodiments of the present invention are directed to a terminal system that improves user convenience. That is, aspects of embodiments of the invention are directed to a flexible terminal that improves user convenience.

According to an aspect of the present invention, a terminal system includes a first terminal and a second terminal that are coupled to each other through a local area wireless communication network, and the second terminal senses an amount of transformation of the second terminal and displays different information according to the amount of transformation of the second terminal.

The second terminal may display information generated by the first terminal or information generated by the second terminal according to the amount of transformation of the second terminal. When the second terminal is transformed by at least a reference amount, the second terminal may be coupled to the first terminal through the local area wireless communication network and may display information received from the first terminal. When the amount of transformation of the second terminal is less than a reference amount, the second terminal may display information generated by the second terminal.

When the amount of transformation of the second terminal is less than a reference amount, a local area wireless communication function between the second terminal and the first terminal may be discontinued.

According to some embodiments, a terminal system includes a first terminal including a first communication unit that transmits and/or receives information through a local area wireless communication network and a first control unit that controls the first communication unit. The terminal system also includes a second terminal including a second communication unit that communicates with the first communication unit, a second control unit that controls the second communication unit, a display unit that is controlled by the second control unit and displays information, and a transformation sensing unit. The transformation sensing unit senses the amount of transformation of the second terminal, and the second control unit receives information about the amount of transformation of the second terminal from the transformation sensing unit and controls the display unit according to the received information.

The second terminal may display information generated by the first terminal or information generated by the second terminal according to the amount of transformation of the second terminal, the amount of transformation of the second terminal being sensed by the transformation sensing unit.

The local area wireless communication between the first communication unit and the second communication unit may be started according to the amount of transformation of the second terminal, the amount of transformation of the second terminal being sensed by the transformation sensing unit.

Information that is displayed on the display unit when the first communication unit and the second communication unit are coupled over the local area wireless communication network may be different from that when the first communication unit and the second communication unit are not coupled over the local area wireless communication network.

Information received from the first terminal may be displayed on the display unit when the first communication unit and the second communication unit are coupled over the local area wireless communication network, and information generated by the second terminal may be displayed on the display unit when the first communication unit and the second communication are not coupled over the local area wireless communication network.

The second communication unit may be activated to enable local area wireless communication when the amount of transformation of the second terminal is equal to or greater than a reference amount, and the second communication unit may be deactivated to disable the local area wireless communication when the amount of transformation of the second terminal is less than the reference amount, the amount of transformation of the second terminal being sensed by the transformation sensing unit.

The first control unit may activate the first communication unit to enable local area wireless communication when the amount of transformation of the second terminal is equal to or greater than a reference amount, the amount of transformation of the second terminal being sensed by the transformation sensing unit.

When the amount of transformation of the second terminal is equal to or greater than a reference amount, the second control unit may transmit information about the amount of transformation of the second terminal to the first control unit, and the first control unit may activate the first communication unit to enable local area wireless communication, the amount of transformation of the second terminal being sensed by the transformation sensing unit.

When the amount of transformation of the second terminal is equal to or greater than a reference amount, the second communication unit may transmit information about the extent of transformation of the second terminal to the first control unit, and the first control unit may activate the first communication unit to enable local area wireless communication, the amount of transformation of the second terminal being sensed by the transformation sensing unit The local area wireless communication network may be a Bluetooth network.

The first terminal may be a mobile phone.

The second terminal may be flexible and adapted to be bent or folded.

The second terminal may be a band configurable to be worn on a portion of a user's body.

The first control unit and the first communication unit may be integrated. The second control unit and the second communication unit may be integrated.

The display unit may include a first electrode, a second electrode, and an intermediate layer between the first electrode and the second electrode, the intermediate layer including an organic emission layer. The display unit may further include a thin film transistor that is electrically coupled to the first electrode, the thin film transistor including an active layer, a gate electrode, a source electrode, and a drain electrode. The first electrode may be on the same layer as the gate electrode.

The display unit may include a liquid crystal layer.

In some embodiments, a flexible terminal has a local area wireless communication function, and the flexible terminal may sense the amount of transformation of the flexible terminal and may display different information according to the amount of transformation of the flexible terminal.

The local area wireless communication function of the flexible terminal may be activated when the flexible terminal is transformed by at least a reference amount, and the local area wireless communication function of the flexible terminal may be deactivated when the flexible terminal is transformed by less than the reference amount.

When the flexible terminal is transformed by at least a reference amount, the local area wireless communication function of the flexible terminal may be activated, and the flexible terminal may be coupled to an external terminal through a local area wireless communication network and the flexible terminal may display information received from the external terminal.

When the flexible terminal is transformed by less than a reference amount, the flexible terminal may display information generated by the flexible terminal.

A terminal system and flexible terminal according to embodiments of the present invention may improve user convenience.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION

Hereinafter, the present invention will be described in detail by explaining exemplary embodiments of the invention with reference to the attached drawings.

Figure 1:
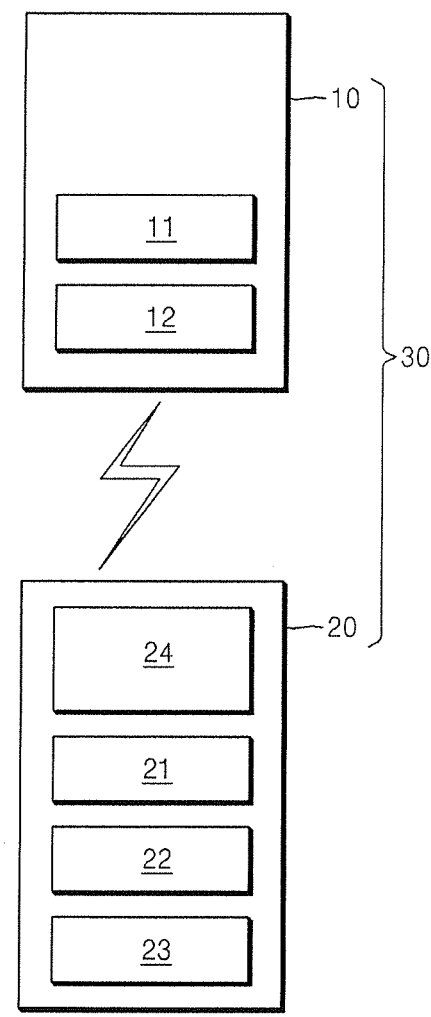
FIG. 1 is a diagram schematically illustrating a terminal system according an embodiment of the present invention.

FIG. 1 is a diagram schematically illustrating a terminal system 30 according an embodiment of the present invention. Referring to FIG. 1, the terminal system 30 includes a first terminal 10 and a second terminal 20. The first terminal 10 and the second terminal 20 are separated and spaced apart from each other. In a specific condition, the first and second terminals are coupled (e.g., connected) to each other over a wireless local area network such as a Bluetooth (Bluetooth is a registered trademark of Bluetooth Sig, Inc., a Delaware Corporation) network. Further details are described below.

Figure 2:
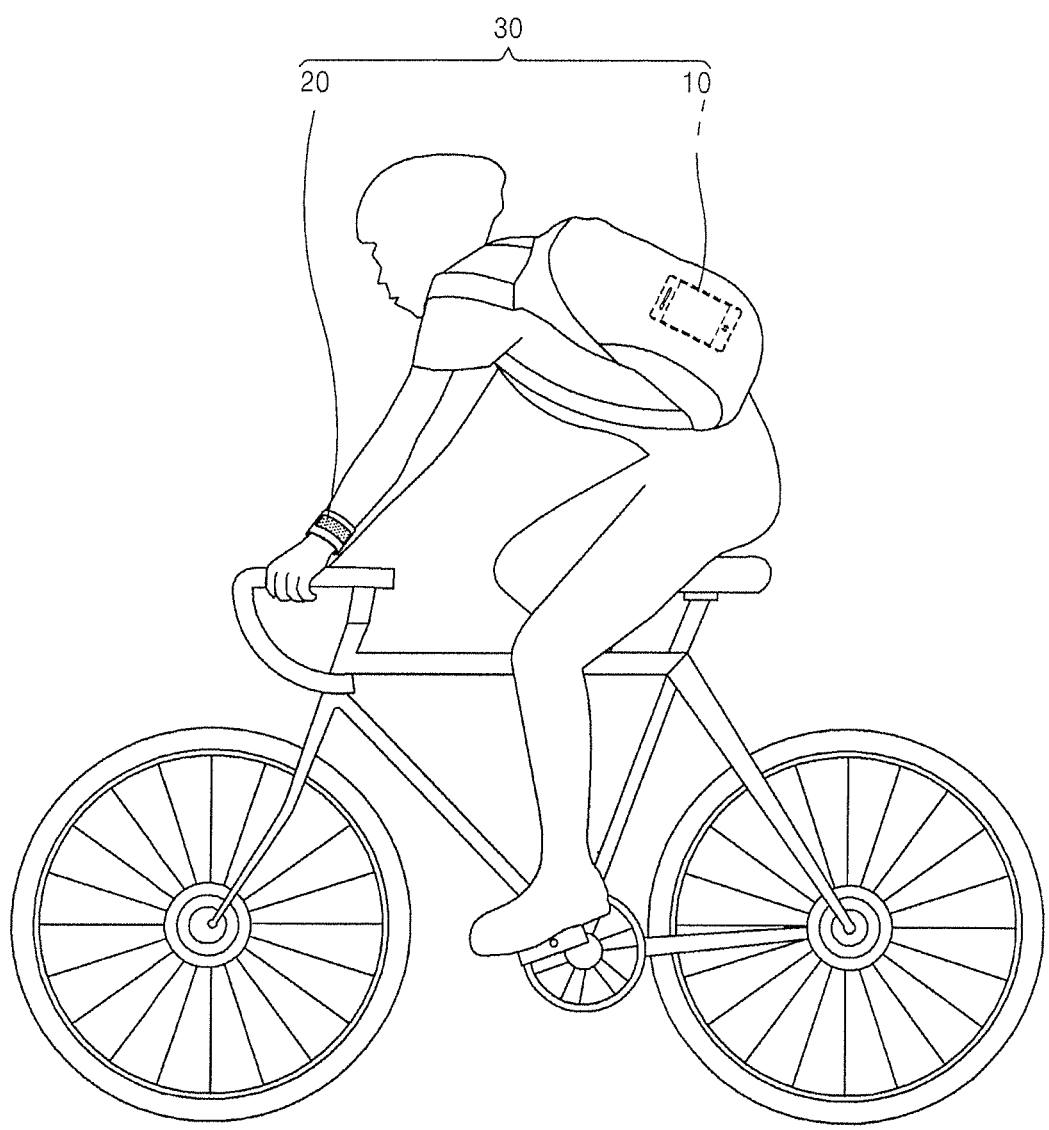
FIG. 2 is a diagram illustrating an example in which the terminal system of FIG. 1 is used.

The first terminal 10 includes a first control unit 11 and a first communication unit 12. Although in FIG. 1, the first control unit 11 and the first communication unit 12 are separated from each other, the present invention is not limited thereto. That is, the first control unit 11 and the first communication unit 12 may be integrated. As illustrated in FIG. 2, the first terminal 10 may be a mobile phone, in particular, a smartphone. The first control unit 11 controls the first communication unit 12 so that the first terminal 10 and the second terminal 20 communicate with each other, further details of which are included below.

The second terminal 20 includes a second control unit 21, a second communication unit 22, a transformation sensing unit 23, and a display unit 24.

The second terminal 20 has flexibility so that it may be bent and/or folded according to a user's convenience. As a detailed example, as illustrated in FIG. 2, the second terminal 20 may be worn on a user's wrist in the form of a band. The present invention is not limited thereto, and the second terminal 20 having flexibility may be worn on any portion of the body, be attached to clothing, and may also be fixed to a portion of a bicycle or other device. That is, the second terminal 20 is formed to be fixed to a portion of the body, a portion of clothing, or a portion of a bicycle so that a user may easily check the display unit 24 while riding a bicycle as illustrated in FIG. 2 or doing other types of exercise.

The transformation sensing unit 23 senses the extent of transformation (e.g., the extent of bending and/or folding) when the second terminal 20 is transformed by bending or folding thereof while, for example, wearing the second terminal 20 on a portion of the body, for example, the wrist. For this, the transformation sensing unit 23 may include various sensors, and for example, a piezoelectric sensor.

The second control unit 21 receives information about the extent of transformation of the second terminal 20, which the transformation sensing unit 23 has sensed.

An operation of the second communication unit 22 is controlled by the second control unit 21. That is, when the second control unit 21 determines that the second terminal 20 has been transformed by a set or predetermined size or amount (e.g., a reference amount or first amount) through information received from the transformation sensing unit 23, the second control unit 21 allows the second communication unit 22 and the first communication unit 12 to be coupled (e.g., connected) to each other over a local area wireless communication network and to transmit and receive information between them.

As a detailed example, the second control unit 21 activates the second communication unit 22 to enable local area wireless communication, for example, Bluetooth communication, as a result of information received from the transformation sensing unit 23. In addition, the second control unit 21 transmits a signal to the first control unit 11, and the first control unit 11 activates the first communication unit 12 to enable local area wireless communication, for example, Bluetooth communication, as a result of the signal received from the second control unit 21.

The activated first communication unit 12 and the activated second communication unit 22 may be coupled to each other by the local area wireless communication network and may exchange information with each other. In particular, information may be transmitted from the first terminal 10 to the second terminal 20.

As another example, the second control unit 21 activates the second communication unit 22 to enable local area wireless communication, for example, Bluetooth communication, as a result of information received from the transformation sensing unit 23. The second communication unit 22 then transmits a signal to the first control unit 11 by using the local area wireless communication, and the first control unit 11 activates the first communication unit 12 to enable local area wireless communication, for example, Bluetooth communication, as a result of the signal received from the second communication unit 22.

The first control unit 11 controls the first communication unit 12 to transmit predetermined or set information, selected in advance, from the first communication unit 12 to the second communication unit 22. The first control unit 11 also activates the first communication unit 12 to enable local area wireless communication when receiving a signal from the second control unit 21 or the second communication unit 22 as described above. As a detailed example, information that is transmitted from the first communication unit 12 to the second communication unit 22 may be text messages received by the first terminal 10, and may be the current moved distance or moved time of a user, which has been measured by the first terminal 10.

That is, when the first terminal 10 is a smartphone, it may include various applications for checking a body condition of a user. The first terminal 10 may obtain information of a user through the various applications, and may transmit the information from the first communication unit 12 to the second communication unit 22.

The display unit 24 displays information of the first terminal 10 received through communication between the first communication unit 12 and the second communication unit 22. That is, the display unit 24 displays, for example, text messages received by the first terminal 10 or various information of a user, which has been measured by the first terminal 10. In this case, the second control unit 21 controls the display unit 24 so that the display unit 24 may appropriately display information which the second communication unit 22 has received from the first communication unit 12.

The display unit 24 may display information generated by the second terminal 20 according to information sensed by the transformation sensing unit 23. That is, when the extent of transformation of the second terminal 20, which the transformation sensing unit 23 has sensed, is smaller than a predetermined or set amount (e.g., a reference amount), brief information generated by the second terminal 20, instead of information of the first terminal 10, may be displayed. Further details are described below.

A detailed operation of the terminal system 30 is explained below with reference to FIGS. 3 and 4.

Figure 3:
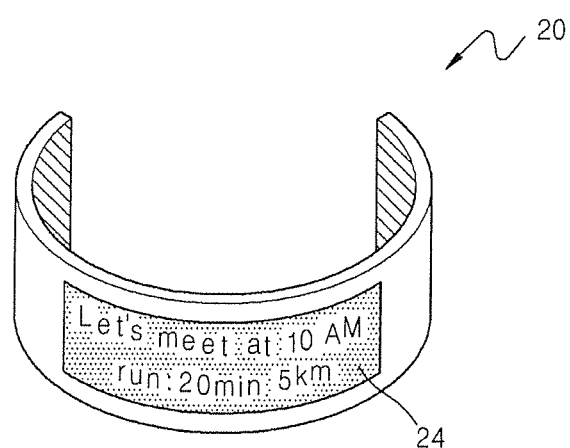
FIG. 3 illustrates a bent second terminal of FIG. 1.

FIG. 3 illustrates a bent second terminal 20. In detail, FIG. 3 illustrates a form of the second terminal 20 when a user is wearing the second terminal 20 on the wrist as illustrated in FIG. 2.

When the second terminal 20 is bent as in FIG. 3, for example, when a user wears the second terminal 20 on the wrist, the transformation sensing unit 23 of the second terminal 20 senses a bend of the second terminal 20 and transmits information about a sensed result to the second control unit 21. The second control unit 21 determines that the second terminal 20 has been bent by a predetermined or set amount (e.g., a reference amount), through the information sensed by the transformation sensing unit 23, and activates the second communication unit 22 to enable a local area wireless connection (e.g., Bluetooth communication).

Then, the second control unit 21 transmits a signal to the first control unit 11 according to the information about the sensed result. As described above, the second communication unit 22 activated by the second control unit 21 may transmit the signal to the first control unit 11 (instead of the second control unit 21).

The first control unit 11 that has received the signal from the second control unit 21 or the second communication unit 22 activates the first communication unit 12 to enable local area wireless communication between the first communication unit 12 and the second communication unit 22. Through the local area wireless communication network, information of the first terminal 10 is transmitted to the second terminal 20. As a detailed example, the first terminal 10 may be a mobile phone such as a smartphone, and the first terminal 10 may transmit a received text message to the second terminal 20. In addition, when a user moves, for example, while riding a bicycle as illustrated in FIG. 2, the first terminal 10 may measure a movement distance and/or a moved time at a specific point in time and may transmit the measured distance and time to the second terminal 20. As described above, the first terminal 10 may measure the moved distance and the moved time by including an application for providing a GPS function.

When the second communication unit 22 receives the information of the first terminal 10 through the local area wireless communication network, the second control unit 21 that controls the second communication unit 22 and the display unit 24 makes the display unit 24 display the information of the first terminal 10 in an appropriate form. That is, as a detailed example, as illustrated in FIG. 3, the text message received by the first terminal 10 is displayed on an upper side of the display unit 24, and the moved distance and moved time measured by the first terminal 10 is displayed on a lower side of the display unit 24.

The first terminal 10 may acquire various information and may process the acquired information. That is, the first terminal 10 that is a smartphone may acquire various information, for example, call waiting information, traffic volume around the current position of a user, or the like by using software embedded therein, an application downloaded by the user, and/or a separately installed chip. The first terminal 10 may then display some or all of the various information on the display unit 24 of the second terminal 20.

In the current embodiment, because the second terminal 20 receives various information acquired by the first terminal 10 and displays some or all of the received information on the display unit 24 without a separate information generation component, the second terminal 20 may be lighter, smaller, and more compact. Thus, it may be more convenient and comfortable to wear the second terminal 20 on a portion of the body.

Figure 4:
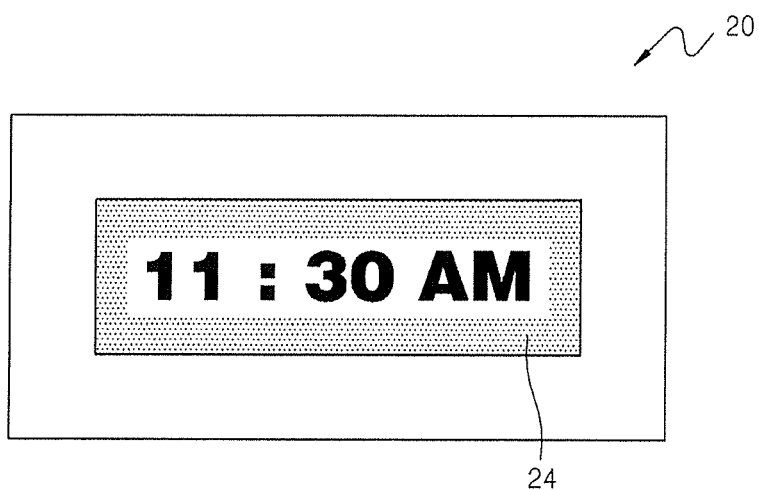
FIG. 4 illustrates a flat second terminal of FIG. 1.

FIG. 4 illustrates a flat second terminal 20. As illustrated in FIG. 4, when the second terminal 20 is flat, that is, the second terminal 20 is not worn on the wrist of a user, the transformation sensing unit 23 senses the state of the second terminal 20 and transmits information about the sensed state to the second control unit 21, and the second control unit 21 disables a local area wireless communication function of the second communication unit 22.

In addition, in its flat (or untransformed) state, the second control unit 21 of the second terminal 20 may generate predetermined or set information, e.g., information such as the current time, that is, e.g., received from a time information chip (not shown) separately disposed in the second terminal 20, and makes the display unit 24 display the information.

That is, as illustrated in FIG. 4, the second terminal 20 directly displays information thereon (i.e., time), independent of the information of the first terminal 10.

In this case, since a local area wireless communication function of the second communication unit 22 of the second terminal 20 is discontinued, the second control unit 21 does not need to transmit a separate signal to the first control unit 11 of the first terminal 10. However, as a selective example, the second control unit 21 may transmit a separate signal to the first control unit 11, and the first control unit 11 may interrupt the local area wireless communication function of the first communication unit 12.

When performing an activity, such as cycling or running, the first terminal 10, such as a smartphone, may be stored in a knapsack (or other bag or purse), and thus, a user may not easily check information of the first terminal 10. In the terminal system 30 according to the current embodiment, a user may also check desired information through the second terminal 20.

Also, the second terminal 20 is formed to have a form of a band having flexibility that is easily worn on a portion of the body of a user, for example, the wrist, thereby improving user convenience.

In particular, as transformation of the second terminal 20 is sensed, the second terminal 20 communicates with the first terminal 10 when the second terminal 20 has been transformed. That is, the second terminal is worn on the wrist of a user and thus the user may be able to substantially check only the second terminal 20. A communication function between the first terminal 10 and the second terminal 20 is deactivated when the second terminal 20 has not been transformed (e.g., is flat), that is, when the user is not wearing the second terminal 20, and thus is not checking the second terminal 20. Thus, user convenience may be improved and the terminal system 30 may be optimized. In addition, the efficiency of electrical power use of the first and second terminals 10 and 20 may be improved through an efficient operation of the first and second terminals 10 and 20.

In addition, since the second terminal 20 does not generate complicated information but generates only simple information, it is relatively easy to make the second terminal 20 smaller and more compact, and thus, it is possible to increase the ways to wear the second terminal 20 and to improve design flexibility of the second terminal 20.

Since the second terminal 20 according to the current embodiment has flexibility, the display unit 24 may also have flexibility. In addition, the second terminal 20 may include various forms of display units in which information is displayed (and be visually recognized by a user). A detailed example of the display unit 24 is described below.

Figure 5:
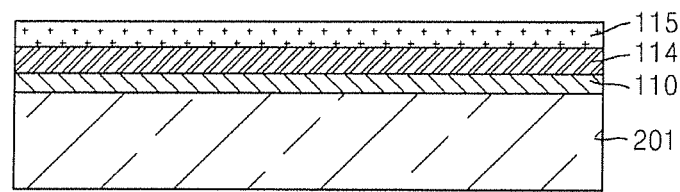
FIG. 5 is a cross-sectional view illustrating an example of a display unit of the second terminal.

FIG. 5 is a cross-sectional view illustrating an example of the display unit 24 of the second terminal 20.

Referring to FIG. 5, the display unit 24 includes a first electrode 110, an intermediate layer 114, and a second electrode 115 on a substrate 201.

Hereinafter, a configuration of each element will now be described in detail.

The substrate 101 is formed of a flexible material. For example, the substrate 101 may be formed of a transparent plastic material or any other suitable flexible substrate material.

The first electrode 110 is formed on the substrate 101. The first electrode 110 may include a material such as indium tin oxide (ITO), indium zinc oxide (IZO), ZnO, or $In_2O_3$. Also, according to a purpose and a design, the first electrode 110 may further include a reflection film formed of Ag, Mg, Al, Pt, Pd, Au, Ni, Nd, Ir, Cr, Li, Yb, and/or Ca.

Although not illustrated, a buffer layer (not shown) may be formed between the substrate 101 and the first electrode 110. The buffer layer prevents impurities (e.g., undesirable elements) from entering into the substrate 101 and provides a flat surface on the substrate 101. The buffer layer may be formed by using one of various materials capable of performing the aforementioned functions. For example, the buffer layer may include inorganic materials such as silicon oxide, silicon nitride, silicon oxynitride, aluminum oxide, aluminum nitride, titanium oxide, titanium nitride, and/or the like; organic materials such as polyimides, polyesters, compounds containing an acryl group, and/or the like; or may be a stacked structure including multiple layers, each layer optionally including one or more of the aforementioned materials.

The intermediate layer 114 is formed on the first electrode 110. The intermediate layer 114 includes an organic emission layer to form visible light. The intermediate layer 114 may be formed as a low-molecular weight organic layer or a high-molecular weight organic layer. When the intermediate layer 114 is formed as a low-molecular weight organic layer, the intermediate layer 114 may include a hole injection layer (HIL), a hole transport layer (HTL), an organic emission layer, an electron transport layer (ETL), an electron injection layer (EIL), and the like.

The HIL may be formed of a phthalocyanine compound such as copper phthalocyanine, a star-burst type amine such as tris(4-carbazoyl-9-ylphenyl)amine (TCTA), 4,4',4"-Tris (N-3-methylphenyl-N-phenylamino)triphenylamine (m-MT-DATA), and/or 1,3,5-tris[4-(3-methylphenylphenylamino) phenyl]benzene (m-MTDAPB), and/or the like.

The HTL may be formed of N,N'-bis(3-methylphenyl)-N, N'-diphenyl-[1,1-biphenyl]-4,4'-diamine (TPD), N,N'-di (naphthalene-1-yl)-N,N'-diphenyl benzidine (α-NPD), and/or the like.

The EIL may be formed of a material such as LiF, NaCl, CsF, $Li_2O$, BaO, lithium quinolate (Liq), and/or the like.

The ETL may be formed of $Alq_3$ and/or the like.

The organic emission layer may include a host material and a dopant material.

The host material of the organic emission layer may be tris(8-hydroxy-quinolinato)aluminum ($Alq_3$), 9,10-di (naphth-2-yl)anthracene (ADN), 3-tert-butyl-9,10-di (naphth-2-yl)anthracene (TBADN), 4,4'-bis(2,2-diphenyl-ethene-1-yl)-4,4'-dimethylphenyl (DPVBi), 4,4'-bis(2,2-diphenyl-ethene-1-yl)-4,4'-dimethylphenyl (p-DMDPVBi), tert(9,9-diarylfluorene)s (TDAF), 2-(9,9'-spirobifluorene-2-yl)-9,9'-spirobifluorene(BSDF), 2,7-bis(9,9'-spirobifluorene-2-yl)-9,9'-spirobifluorene (TSDF), bis(9,9-diarylfluorene)s (BDAF), 4,4'-bis(2,2-diphenyl-ethene-1-yl)-4,4'-di-(tert-butyl)phenyl (p-TDPVBi), 1,3-bis(carbazol-9-yl) benzene (mCP), 1,3,5-tris(carbazol-9-yl)benzene (tCP), 4,4', 4"-tris(carbazol-9-yl)triphenylamine (TcTa), 4,4'-bis (carbazol-9-yl)biphenyl (CBP), 4,4'-bis(9-carbazolyl)-2,2'-dimethyl-biphenyl (CBDP), 4,4'-bis(carbazol-9-yl)-9,9-dimethyl-fluorene (DMFL-CBP), 4,4'-bis(carbazol-9-yl)-9,9-bis(9-phenyl-9H-carbazol)fluorene (FL-4CBP), 4,4'-bis(carbazol-9-yl)-9,9-di-tolyl-fluorene (DPFL-CBP), 9,9-bis(9-phenyl-9H-carbazol)fluorene (FL-2CBP), and/or the like.

Examples of the dopant material of the organic emission layer include 4,4'-bis[4-(di-p-tolylamino)styryl]biphenyl (DPAVBi), 9,10-di(naphth-2-yl)anthracene (ADN), 3-tert-butyl-9,10-di(naphth-2-yl)anthracene (TBADN), and/or the like.

The second electrode 115 is formed on the intermediate layer 114. The second electrode 115 may be formed of a metal such as Ag, Mg, Al, Pt, Pd, Au, Ni, Nd, Ir, Cr, Li, and/or Ca.

Figure 6:
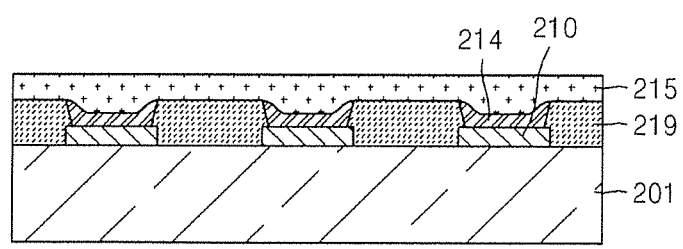
FIG. 6 is a cross-sectional view illustrating another example of the display unit of the second terminal.

FIG. 6 is a cross-sectional view illustrating another example of the display unit 24 of the second terminal 20.

Referring to FIG. 6, the display unit 24 includes a first electrode 210, a pixel-defining layer 219, an intermediate layer 214, and a second electrode 215 on a substrate 201. Hereinafter, a configuration of each element will be described in detail. For convenience of description, mainly the differences from the above example will now be described.

The first electrode 210 is formed on the substrate 201.

The pixel-defining layer 219 is formed on the first electrode 210 by using an insulation material. In this case, the pixel-defining layer 219 has an opening to expose an upper surface of the first electrode 210.

The intermediate layer 214 is formed on the exposed upper surface of the first electrode 210. The intermediate layer 214 includes an organic emission layer to emit visible light. The second electrode 215 is formed on the intermediate layer 214.

Figure 7:
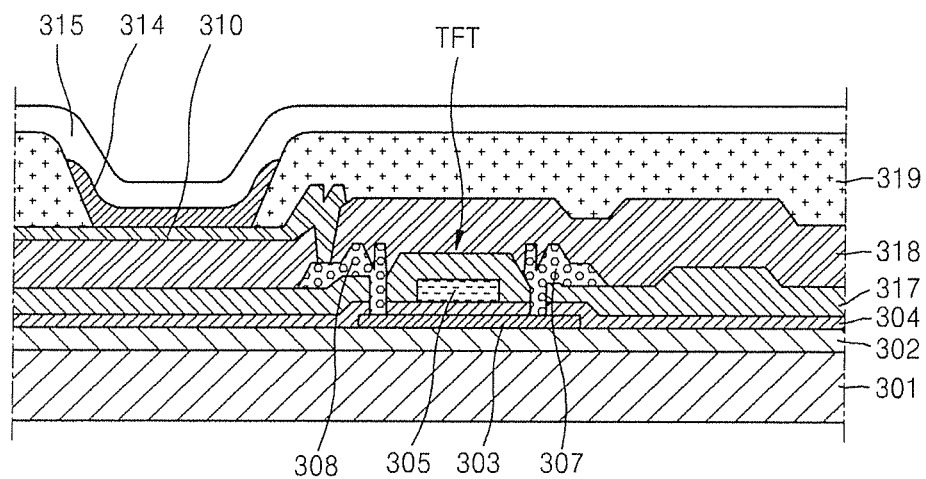
FIG. 7 is a cross-sectional view illustrating another example of the display unit of the second terminal.

FIG. 7 is a cross-sectional view illustrating another example of the display unit 24 of the second terminal 20.

Referring to FIG. 7, the display unit 24 includes a thin film transistor TFT formed on a substrate 301. The TFT includes an active layer 303, a gate electrode 305, a source electrode 307, and a drain electrode 308.

A buffer layer 302 may optionally be formed on the substrate 301.

The active layer 303 having a predetermined or set pattern (e.g., a first pattern) is formed on the buffer layer 302. The active layer 303 may be formed of an inorganic semiconductor, such as amorphous silicon or polysilicon, or an organic semiconductor. The active layer 303 includes a source area, a drain area, and a channel area. The source and drain areas of the active layer 303 may be formed by doping the active layer 303 with Group III and/or Group V impurities after the active layer 303 is formed of amorphous silicon or polysilicon.

A gate insulation film 304 is formed on the active layer 303, and the gate electrode 305 is formed on a predetermined or set area (e.g., a first area) of the gate insulation film 304. The gate insulation film 304 insulates the gate electrode 305 from the active layer 303 and may be formed of an organic material or an inorganic material, such as SiNx and/or $310_2$.

The gate electrode 305 may include Au, Ag, Cu, Ni, Pt, Pd, Al, Mo, and/or an alloy, and may be an Al:Nd alloy or a Mo:W alloy. However, the material for forming the gate electrode 305 is not limited thereto, and various other materials may also be used to form the gate electrode 305 in consideration of adhesion with respect to an adjacent layer, planarization, electric resistance, and/or processability.

An interlayer dielectric 317 is formed on the gate electrode 305. The interlayer dielectric 317 and the gate insulation film 304 are formed to expose the source and drain areas of the active layer 303. The source electrode 307 and the drain electrode 308 are formed to contact respective exposed source and drain areas of the active layer 303.

The source electrode 307 and the drain electrode 308 may each be formed of any one of various conductive materials and may have a single-layer or multi-layer structure.

A passivation layer 318 is formed on the TFT. In detail, the passivation layer 318 is formed on the source electrode 307 and the drain electrode 308.

The passivation layer 318 is formed to expose a predetermined or set area (e.g., a first area) of the drain electrode 308 by not covering the whole drain electrode 308. A first electrode 310 is formed to be coupled (e.g. connected) to the exposed portion of the drain electrode 308.

A pixel-defining film 319 is formed of an insulating material on the first electrode 310. The pixel-defining film 319 is formed to expose a predetermined or set area (e.g., a first area) of the first electrode 310. An intermediate layer 314 is formed to be coupled (e.g. connected) to the exposed portion of the first electrode 310. Also, a second electrode 315 is formed to be coupled (e.g. connected) to the intermediate layer 314.

A sealing element (not shown) may be disposed on the second electrode 315. The sealing element may be formed to protect the intermediate layer 314 and other layers from external humidity and/or oxygen. The sealing element may include plastic or may have a multi-layer structure of alternating organic material and inorganic material.

Figure 8:
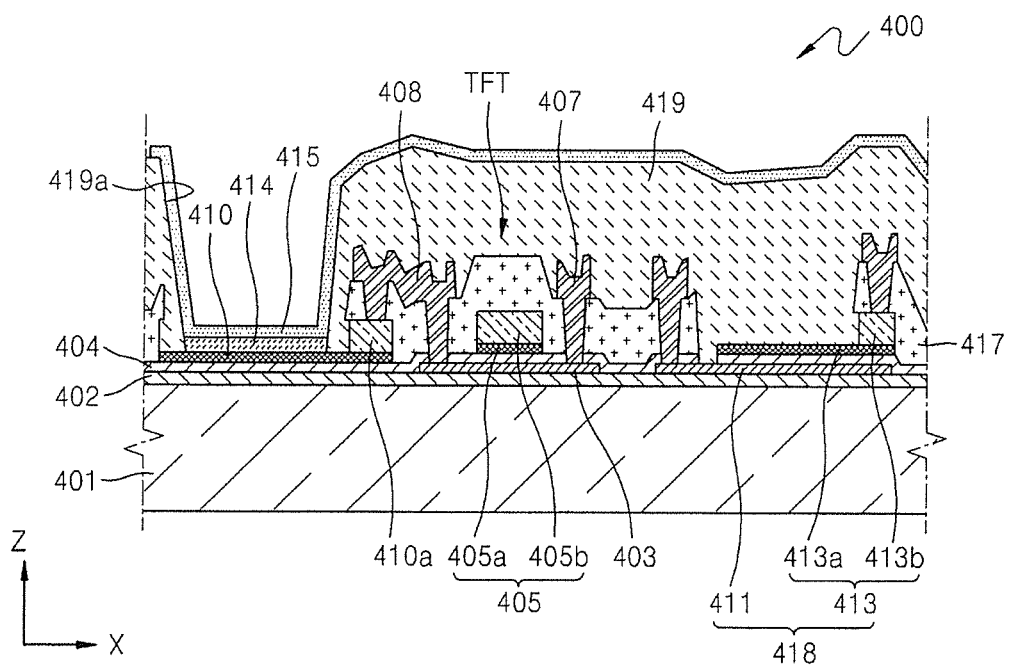
FIG. 8 is a cross-sectional view illustrating another example of the display
Figure 9:
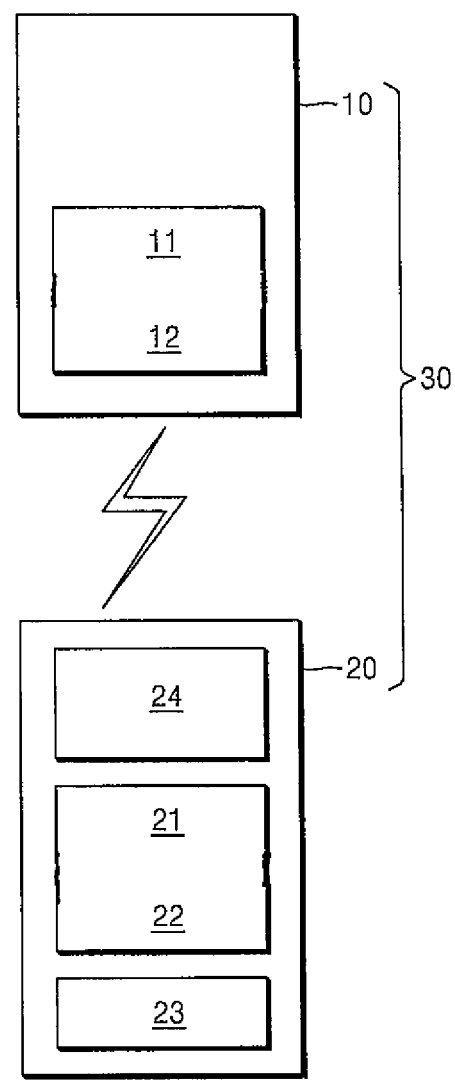
FIG. 9 is a diagram schematically illustrating a terminal system according to another embodiment of the present invention. unit of the second terminal.

FIG. 8 is a cross-sectional view illustrating another example of the display unit 24 of the second terminal 20. Referring to FIG. 8, the display unit 24 includes a capacitor 418 and a thin film transistor TFT formed on a substrate 401. The TFT includes an active layer 403, a gate electrode 405, a source electrode 407, and a drain electrode 408.

A buffer layer 402 is formed on the substrate 401. The active layer 403 having a predetermined or set area (e.g., a first area) is formed on the buffer layer 402. In addition, a first capacitor electrode 411 is formed on the buffer layer 402. The first capacitor electrode 411 may be formed of the same material as the active layer 403.

A gate insulating layer 404 is formed on the buffer layer 402 to cover the active layer 403 and the first capacitor electrode 411.

The gate electrode 405, a first electrode 410, and a second capacitor electrode 413 are formed on the gate insulating layer 404.

The gate electrode 405 includes a first conductive layer 405a and a second conductive layer 405b.

The first electrode 410 may be formed of the same material as the first conductive layer 405a. A conductive portion 410a is disposed on a predetermined upper portion of the first electrode 410. The conductive portion 410a may be formed of the same material as the second conductive layer 405b.

The second capacitor electrode 413 includes a first layer 413a and a second layer 413b. The first layer 413a may be formed of the same material as the first conductive layer 405a, and the second layer 413b may be formed of the same material as the second conductive layer 405b. The second layer 413b is formed on the first layer 413a to be smaller than the first layer 413a. In addition, the second capacitor electrode 413 overlaps with the first capacitor electrode 411, and is smaller than the first capacitor electrode 411.

An interlayer dielectric 417 is formed on the first electrode 410, the gate electrode 405, and the second capacitor electrode 413. The source electrode 407 and the drain electrode 408 are formed on the interlayer dielectric 417 and are coupled (e.g. connected) to the active layer 403.

In addition, one of the source electrode 407 and the drain electrode 408 is electrically coupled (e.g. connected) to the first electrode 410. For example, FIG. 8 shows that the drain electrode 408 is electrically coupled to the first electrode 410.

In more detail, the drain electrode 408 contacts the active layer 403 and the conductive portion 410a.

A pixel-defining layer 419 is formed on the interlayer dielectric 417 to cover the source electrode 407, the drain electrode 408, and the capacitor 418.

The pixel-defining layer 419 includes an opening 419a that corresponds to an upper surface of the first electrode 410, and an intermediate layer 414 is formed on the first electrode 410 that is exposed through the opening 419a of the pixel-defining layer 419.

A second electrode 415 is formed on the intermediate layer 414. Although not illustrated, a sealing element (not shown) may be disposed on the second electrode 415. The sealing element (not shown) may be formed to prevent damage to the first electrode 410, the intermediate layer 414, or the second electrode 415 by external foreign bodies or shock. The sealing element (not shown) may be formed by using glass, a thin metal film, or the like, or it may have a stacked structure, each layer formed of an organic material and/or an inorganic material.

In the above embodiments of the present invention, only an organic light-emitting device display unit 24 of the second terminal 20 has been described. However, the present invention is not limited thereto. That is, the display unit 24 of the second terminal 20 may be a liquid crystal device or any other suitable display device.

While the present invention has been particularly shown and described with reference to exemplary embodiments thereof, it will be understood by those of ordinary skill in the art that various changes in form and details may be made therein without departing from the spirit and scope of the present invention as defined by the following claims, and equivalents thereof.

What is claimed is:

1. A terminal system comprising a first terminal and a second terminal that are configured to be coupled to each other through a local area wireless communication network,
wherein the second terminal senses an amount of transformation of the second terminal and displays different information according to the amount of transformation of the second terminal,
wherein, when the second terminal is transformed by at least a reference amount, the second terminal is coupled to the first terminal through the local area wireless communication network and displays information received from the first terminal, and
wherein, when the amount of transformation of the second terminal is less than the reference amount, a local area wireless communication function between the second terminal and the first terminal is discontinued.

2. The terminal system of claim 1, wherein the second terminal displays information generated by the first terminal or information generated by the second terminal according to the amount of transformation of the second terminal.

3. The terminal system of claim 1, wherein, when the amount of transformation of the second terminal is less than the reference amount, the second terminal displays information generated by the second terminal.

4. A terminal system comprising:
a first terminal comprising a first communication unit that transmits and/or receives information through a local area wireless communication network and a first control unit that controls the first communication unit; and
a second terminal comprising a second communication unit that communicates with the first communication unit, a second control unit that controls the second communication unit, a display unit that is controlled by the second control unit and displays information, and a transformation sensing unit,
wherein the transformation sensing unit senses an amount of transformation of the second terminal, and the second control unit receives information about the amount of transformation of the second terminal from the transformation sensing unit and controls the display unit according to the received information, and
wherein the second communication unit is activated to enable local area wireless communication when the amount of transformation of the second terminal is equal to or greater than a reference amount, and the second communication unit is deactivated to disable the local area wireless communication when the amount of transformation of the second terminal is less than the reference amount, the amount of transformation of the second terminal being sensed by the transformation sensing unit.

5. The terminal system of claim 4, wherein the second terminal displays information generated by the first terminal or information generated by the second terminal according to the amount of transformation of the second terminal, the amount of transformation of the second terminal being sensed by the transformation sensing unit.

6. The terminal system of claim 4, wherein local area wireless communication between the first communication unit and the second communication unit is started according to the amount of transformation of the second terminal, the amount of transformation of the second terminal being sensed by the transformation sensing unit.

7. The terminal system of claim 4, wherein information that is displayed on the display unit when the first communication unit and the second communication unit are coupled over the local area wireless communication network is different from that when the first communication unit and the second communication unit are not coupled over the local area wireless communication network.

8. The terminal system of claim 4, wherein information received from the first terminal is displayed on the display unit when the first communication unit and the second communication unit are coupled over the local area wireless communication network, and information generated by the second terminal is displayed on the display unit when the first communication unit and the second communication unit are not coupled over the local area wireless communication network.

9. The terminal system of claim 4, wherein the first control unit activates the first communication unit to enable local area wireless communication when the amount of transformation of the second terminal is equal to or greater than the reference amount, the amount of transformation of the second terminal being sensed by the transformation sensing unit.

10. The terminal system of claim 4, wherein, when the amount of transformation of the second terminal is equal to or greater than the reference amount, the second control unit transmits information about the amount of transformation of the second terminal to the first control unit, and the first control unit activates the first communication unit to enable local area wireless communication, the amount of transformation of the second terminal being sensed by the transformation sensing unit.

11. The terminal system of claim 4, wherein, when the amount of transformation of the second terminal is equal to or greater than the reference amount, the second communication unit transmits information about the amount of transformation of the second terminal to the first control unit, and the first control unit activates the first communication unit to enable local area wireless communication, the amount of transformation of the second terminal being sensed by the transformation sensing unit.

12. The terminal system of claim 4, wherein the local area wireless communication network is a Bluetooth network.

13. The terminal system of claim 4, wherein the first terminal is a mobile phone.

14. The terminal system of claim 4, wherein the second terminal is flexible.

15. The terminal system of claim 4, wherein the second terminal is a band.

16. The terminal system of claim 4, wherein the first control unit and the first communication unit are integrated.

17. The terminal system of claim 4, wherein the second control unit and the second communication unit are integrated.

18. The terminal system of claim 4, wherein the display unit comprises a first electrode, a second electrode, and an intermediate layer between the first electrode and the second electrode, the intermediate layer comprising an organic emission layer.

19. The terminal system of claim 18, wherein the display unit further comprises a thin film transistor that is electrically coupled to the first electrode, the thin film transistor comprising an active layer, a gate electrode, a source electrode, and a drain electrode.

20. The terminal system of claim 18, wherein the display unit further comprises a thin film transistor that is electrically coupled to the first electrode, the thin film transistor comprising an active layer, a gate electrode, a source electrode, and a drain electrode, wherein the first electrode is on a same layer as the gate electrode.

21. The terminal system of claim 4, wherein the display unit comprises a liquid crystal layer.

22. A flexible terminal having a local area wireless communication function,
wherein the flexible terminal senses an amount of transformation of the flexible terminal and displays different information according to the amount of transformation of the flexible terminal, and
wherein the local area wireless communication function of the flexible terminal is activated when the flexible terminal is transformed by at least a reference amount, and the local area wireless communication function of the flexible teiminal is deactivated when the flexible terminal is transformed by less than the reference amount.

23. The flexible terminal of claim 22, wherein, when the flexible terminal is transformed by at least the reference amount, the local area wireless communication function of the flexible terminal is activated, and the flexible terminal is coupled to an external terminal through a local area wireless communication network and the flexible terminal displays information received from the external terminal.

24. The flexible terminal of claim 22, wherein, when the flexible terminal is transformed by less than the reference amount, the flexible terminal displays information generated by the flexible terminal.

* * * * *